（12） United States Patent
Warren et al.

(10) Patent No.: US 10,768,059 B2
(45) Date of Patent: Sep. 8, 2020

(54) EMBEDDED OPTICAL PROBE FOR GAS TURBINE ENGINE

(71) Applicant: United Technologies Corporation, Farmington, CT (US)

(72) Inventors: Eli Cole Warren, Wethersfield, CT (US); Michael F. Sabol, Port St. Lucie, FL (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 124 days.

(21) Appl. No.: 15/932,263

(22) Filed: Feb. 16, 2018

(65) Prior Publication Data

US 2019/0257705 A1    Aug. 22, 2019

(51) Int. Cl.
| | |
|---|---|
| *G01L 1/24* | (2006.01) |
| *F02K 3/06* | (2006.01) |
| *F01D 17/02* | (2006.01) |
| *G01H 9/00* | (2006.01) |
| *G01M 15/14* | (2006.01) |

(52) U.S. Cl.
CPC ............ *G01L 1/242* (2013.01); *F01D 17/02* (2013.01); *F02K 3/06* (2013.01); *G01H 9/004* (2013.01); *G01L 1/247* (2013.01); *F05D 2220/323* (2013.01); *F05D 2260/83* (2013.01); *F05D 2270/804* (2013.01); *G01M 15/14* (2013.01)

(58) Field of Classification Search
CPC ......... G01L 1/242; G01L 1/247; G01H 9/004; F01D 17/02; F02K 3/06; F05D 2270/804; F05D 2260/83; F05D 2220/323; G01M 15/14
See application file for complete search history.

(56) References Cited

U.S. PATENT DOCUMENTS

| | | | | |
|---|---|---|---|---|
| 5,201,227 | A | * | 4/1993 | Iinuma ................... G01H 1/006 73/655 |
| 5,277,496 | A | * | 1/1994 | Mayer ................... G01J 5/0014 250/338.1 |
| 5,366,290 | A | | 11/1994 | Mayer et al. |
| 7,966,834 | B2 | | 6/2011 | Rosemount |
| 8,687,206 | B2 | | 4/2014 | Hockaday |
| 9,068,503 | B2 | * | 6/2015 | Kulczyk ................. F02B 51/04 |
| 9,181,818 | B2 | * | 11/2015 | Warren .................. G01D 5/353 |
| 9,188,463 | B2 | * | 11/2015 | Olechnowicz ....... G01D 11/245 |
| 9,366,586 | B2 | * | 6/2016 | Warren ................... F01D 17/02 |

(Continued)

OTHER PUBLICATIONS

European Search Report for Application No. 18212795.1; dated Jun. 21, 2019.

*Primary Examiner* — Freddie Kirkland, III
(74) *Attorney, Agent, or Firm* — Cantor Colburn LLP (57) ABSTRACT

An optical probe for a gas turbine engine includes a housing. Also included is a plurality of optical fibers, a portion of each of the optical fibers secured to fiber holders. Further included is an optical head disposed within the housing and having channels extending in a longitudinal direction of the optical head, the fiber holders disposed within the channels. Yet further included is a cap disposed within the housing and operatively coupled to the optical head, the plurality of optical fibers extending through the cap. Also included is an inner tube operatively coupled to the cap, the plurality of fibers extending through the inner tube.

17 Claims, 7 Drawing Sheets

(56) References Cited

U.S. PATENT DOCUMENTS

| | | |
|---|---|---|
| 9,404,735 B2 | 8/2016 | Paul et al. |
| 9,530,209 B2 * | 12/2016 | Hatcher, Jr. ............ G01B 11/26 |
| 9,612,016 B2 * | 4/2017 | Claussen ............ G01L 19/0663 |
| 9,714,967 B1 * | 7/2017 | Weickert ................ G01N 27/61 |
| 9,952,066 B2 * | 4/2018 | Warren ................. G01D 5/353 |
| 2014/0216155 A1 * | 8/2014 | Olechnowicz ......... G01D 11/26 73/431 |
| 2014/0268100 A1 * | 9/2014 | Paul ...................... G01B 11/16 356/32 |
| 2014/0270625 A1 | 9/2014 | Warren |
| 2018/0224353 A1 * | 8/2018 | Gysling ............... G01M 15/14 |

* cited by examiner

EMBEDDED OPTICAL PROBE FOR GAS TURBINE ENGINE

STATEMENT OF FEDERAL SUPPORT

This invention was made with Government support under Contract No. FA8650-09-D-2923-0021 awarded by the United States Air Force. The Government has certain rights in the invention.

BACKGROUND

Exemplary embodiments pertain to the art of gas turbine engines and, more particularly, to an optical probe for gas turbine engines.

Many cases in turbine engines have very restrictive geometry for placing probes to collect Non-Intrusive Stress Measurement System (NSMS) data for vibratory modes on rotating airfoils. Some of the geometries are very thin and also placed between gas paths, as in engines with multiple gas paths. Current probe designs block or obstruct outer gas paths in order to gather data on the inner blades. Not only are the re-operated cases compromised, but the performance of the asset is not indicative of BOM expectations. This is especially important when development engines are tasked with gathering both sets of data (stress and operability) simultaneously.

BRIEF DESCRIPTION

Disclosed is an optical probe for a gas turbine engine including a housing. Also included is a plurality of optical fibers, a portion of each of the optical fibers secured to fiber holders. Further included is an optical head disposed within the housing and having channels extending in a longitudinal direction of the optical head, the fiber holders disposed within the channels. Yet further included is a cap disposed within the housing and operatively coupled to the optical head, the plurality of optical fibers extending through the cap. Also included is an inner tube operatively coupled to the cap, the plurality of fibers extending through the inner tube.

In addition to one or more of the features described above, or as an alternative, further embodiments may include an outer tube surrounding a portion of the inner tube to define an annulus therebetween, the outer tube operatively coupled to the housing.

In addition to one or more of the features described above, or as an alternative, further embodiments may include that the outer tube is brazed to the housing.

In addition to one or more of the features described above, or as an alternative, further embodiments may include that an axial position of the optical head is fixed with an optical head retention pin extending through the housing and into the optical head.

In addition to one or more of the features described above, or as an alternative, further embodiments may include that the optical head defines a plurality of holes proximate the fiber holders to secure the fiber holders thereto with an adhesive.

In addition to one or more of the features described above, or as an alternative, further embodiments may include that a forward end of the optical head is disposed within a view window defined by the housing.

In addition to one or more of the features described above, or as an alternative, further embodiments may include a mirror operatively coupled to the housing within the view window.

In addition to one or more of the features described above, or as an alternative, further embodiments may include that the mirror is operatively coupled to the housing with a mirror retention pin extending through the housing and into the mirror.

In addition to one or more of the features described above, or as an alternative, further embodiments may include that the cap is welded to the optical head.

In addition to one or more of the features described above, or as an alternative, further embodiments may include that the cap is brazed to the inner tube.

In addition to one or more of the features described above, or as an alternative, further embodiments may include that the cap includes channels for fluidly coupling the annulus defined by the inner and outer tubes with an interior of the optical head.

Also disclosed is gas turbine engine including a flow separation wall separating a first flow path from a second flow path. Also included is an optical probe embedded within the flow separation wall. The optical probe includes a housing operatively coupled to the flow separation wall. The optical probe also includes a plurality of optical fibers, a portion of each of the optical fibers secured to fiber holders. The optical probe further includes an optical head disposed within the housing and having channels extending in a longitudinal direction of the optical head, the fiber holders disposed within the channels. The optical probe yet further includes a cap disposed within the housing and operatively coupled to the optical head, the plurality of optical fibers extending through the cap. The optical probe also includes an inner tube operatively coupled to the cap, the plurality of fibers extending through the inner tube. The optical probe further includes an outer tube surrounding a portion of the inner tube to define an annulus therebetween, the outer tube operatively coupled to the housing.

In addition to one or more of the features described above, or as an alternative, further embodiments may include that the housing includes at least one flange and a main body portion, the main body portion defining an interior of the housing.

In addition to one or more of the features described above, or as an alternative, further embodiments may include that the at least one flange is welded to the flow separation wall.

In addition to one or more of the features described above, or as an alternative, further embodiments may include that the optical probe is completely embedded within the flow separation wall.

In addition to one or more of the features described above, or as an alternative, further embodiments may include that the cap is welded to the optical head.

In addition to one or more of the features described above, or as an alternative, further embodiments may include that the cap is brazed to the inner tube.

In addition to one or more of the features described above, or as an alternative, further embodiments may include that the cap includes channels for fluidly coupling the annulus defined by the inner and outer tubes with an interior of the optical head.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
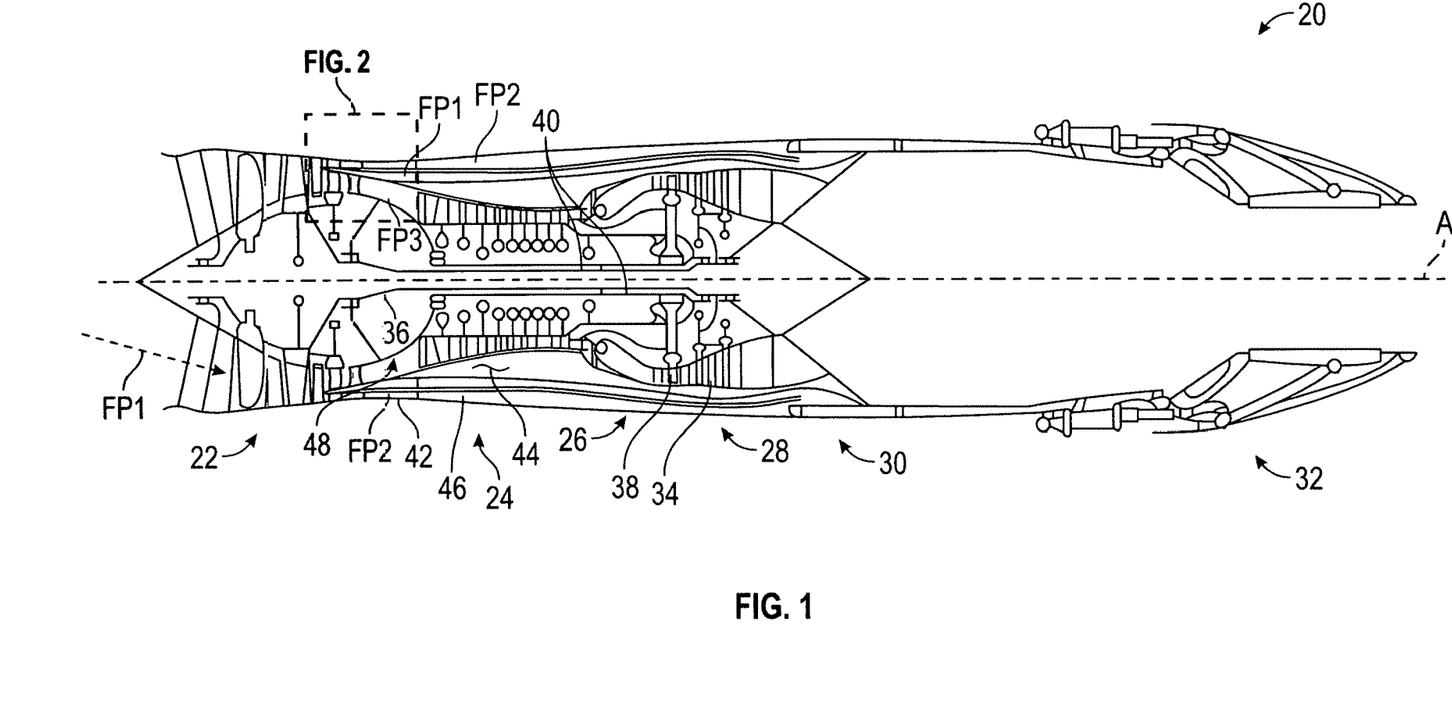
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26, a turbine section 28, an augmenter section 30 and a nozzle section 32. The sections are defined along a central longitudinal engine axis A. Although depicted as an augmented low bypass gas turbine engine in the disclosed non-limiting embodiment, it should be understood that the concepts described herein are applicable to other gas turbine engines including geared architecture engines, direct drive turbofans, turboshaft engines and others.

The compressor section 24, the combustor section 26 and the turbine section 28 are generally referred to as the engine core. The fan section 22 and a low pressure turbine 34 of the turbine section 28 are coupled by a first shaft 36 to define a low spool. The compressor section 24 and a high pressure turbine 38 of the turbine section 28 are coupled by a second shaft 40 to define a high spool.

An outer engine case structure 42 and an inner engine structure 44 define a generally annular secondary flow path 46 around a core flow path 48 of the engine core. It should be understood that various structure within the engine may define the outer engine case structure 42 and the inner engine structure 44 which essentially define an exoskeleton to support the core engine therein.

Air which enters the fan section 22 is divided between a core flow through the core flow path 48 and a secondary flow through the secondary flow path 46. The core flow passes through the combustor section 26, the turbine section 28, then the augmentor section 30 where fuel may be selectively injected and burned to generate additional thrust through the nozzle section 32. The secondary flow may be utilized for a multiple of purposes to include, for example, cooling and pressurization. The secondary flow as defined herein is any flow different from the primary combustion gas exhaust core flow. The secondary flow passes through an annulus defined by the outer engine case structure 42 and the inner engine structure 44 then may be at least partially injected into the core flow adjacent the nozzle section 32.

The outer engine case structure 42 and the inner engine structure 44 as well as other engine structures are often manufactured of Ceramic Matrix Composite, Organic Matrix Composite materials and combinations thereof which are moisture sensitive. The Ceramic Matrix Composite and the Organic Matrix Composite materials will hereinafter be referred to herein as composite materials but it should be understood that any such moisture sensitive materials and structured are also contemplated.

Figure 2:
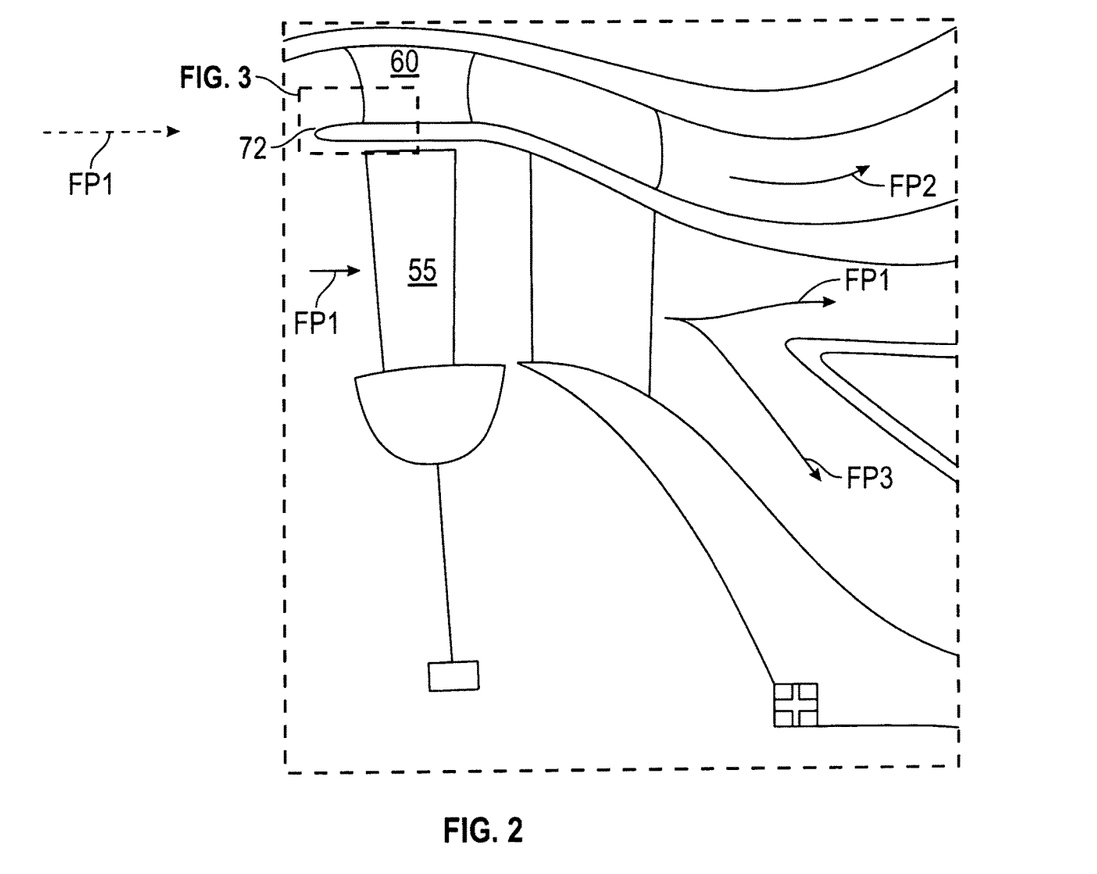
FIG. 2 is a partial cross-sectional view of a portion of the gas turbine engine.

Referring now to FIG. 2, with continued reference to FIG. 1, a portion of the gas turbine engine 20 is illustrated in greater detail. In particular, a radial flow separation wall is shown. The radial flow separation wall 72 is configured to separate a first flow path FP1 of the gas turbine engine 20 from a second flow path FP2 of the gas turbine engine 20. The first flow path FP1 flows through blades 55 of the gas turbine engine 20 and the second flow path FP2 flows through guide vanes, also referred to as stators 60, of the gas turbine engine 20. The first flow path FP1 may be the core flow path 48 seen in FIG. 1 and the second flow path FP2 may be the secondary flow path 46 seen in FIG. 1. It is understood that embodiments disclosed herein are also applicable to gas turbine engines with more than two flow paths. The radial flow separation wall 72 may be composed of one or more components of the gas turbine engine 20.

Figure 3:
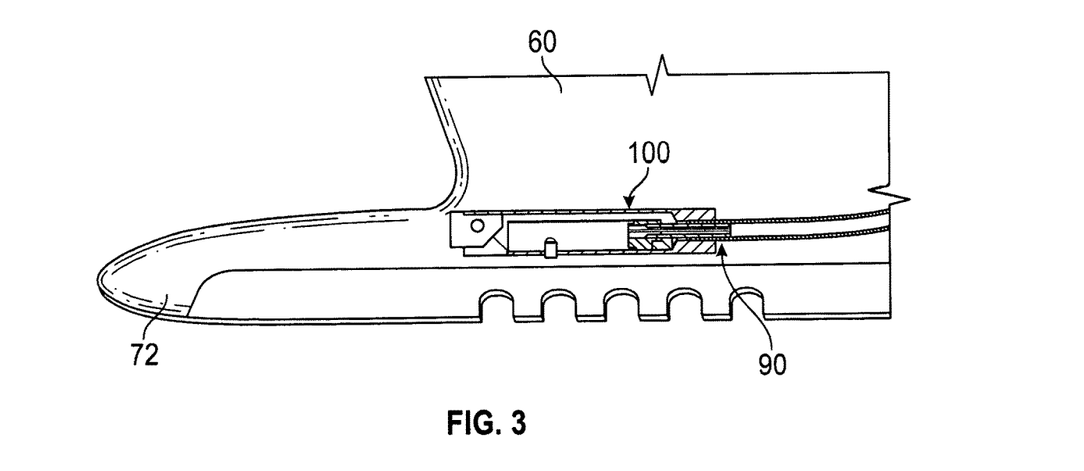
FIG. 3 is a cross-sectional view of an optical probe embedded in a flow separation wall of the gas turbine engine.

Referring now to FIG. 3, an optical probe 100 is embedded in a channel 90 of the radial flow separation wall 72 of a gas turbine engine 20 proximate a base wall of the stator 60, in accordance with an embodiment of the disclosure. The optical probe 100 is configured to collect Non-Intrusive Stress Measurement System (NSMS) data for vibratory modes on the blade 55. The optical probe 100 can be fully embedded in the flow separation wall 72 to collect NSMS data without any impact to the BOM hardware in the embodiments described herein. The low profile design is facilitated by the elimination of typical components requires for other probe designs, with the low profile design avoiding gas path obstruction for more accurate testing.

Figure 4:
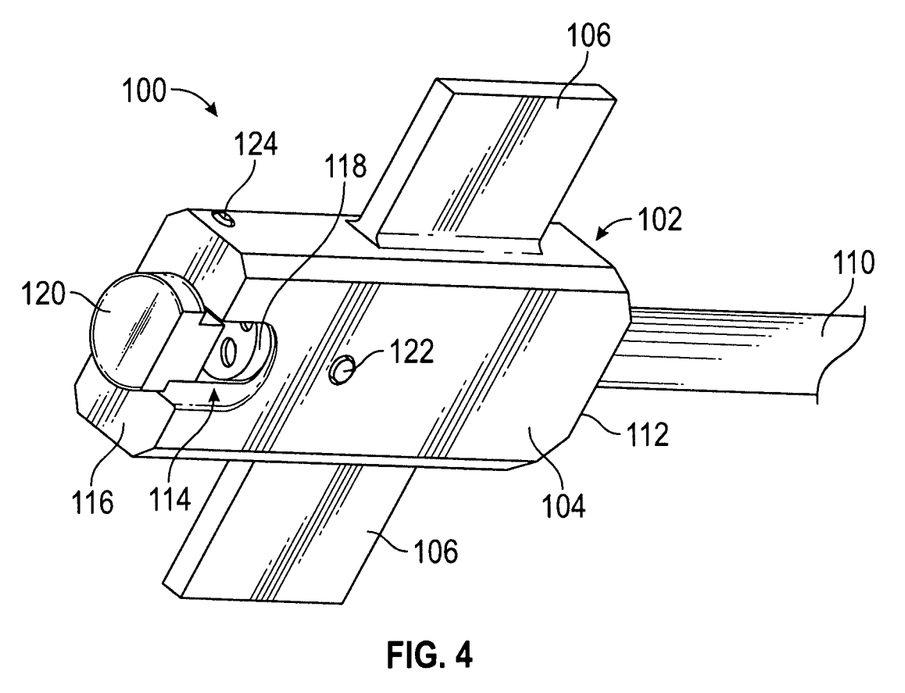
FIG. 4 is a perspective view of the optical probe in an assembled condition.

Referring to FIG. 4, illustrated is an exterior view of the optical probe 100 in an assembled condition. The optical probe 100 includes a housing 102 having a main body 104 and a pair of flanges 106. In some embodiments, the housing 102 is a single, uniformly manufactured component, but it is contemplated that an assembled housing may be utilized. The flanges 106, and/or any other part of the housing 102, may be operatively coupled to the flow separation wall 72 within the channel 90 in any suitable manner. Coupling may include the use of mechanical fasteners, welding, brazing or any other suitable securing technique.

The housing 102 contains a number of internal components which are described herein and illustrated in at least FIGS. 5-9. In FIG. 4, an outer tube 110 containing fibers and a cooling passage is shown extending from an aft end 112 of the housing 102. A view window 114 is defined proximate the forward end 116 of the housing 102. Disposed near or within the view window 114 is a portion of an optical head 118 and a mirror 120. The position of the optical head 118 is fixed with an optics head retention pin 122 and the position of the mirror 120 is fixed with a mirror retention pin 124. Each pin 122, 124 extends through the housing 102 to secure the optical head 118 and the mirror 120, respectively, to the housing 102.

Figure 5:
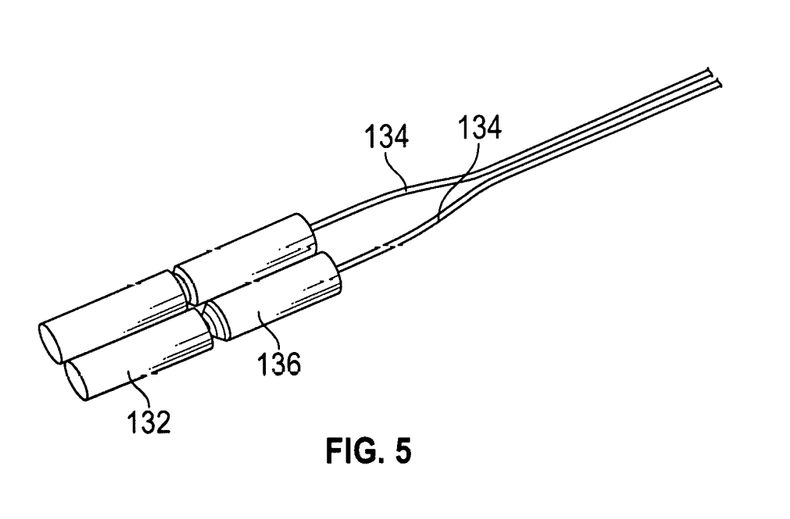
FIG. 5 is a perspective view of a portion of the optical probe in a partially assembled condition.

Referring now to FIG. 5, illustrated are fiber holders 136 holding optical fibers 134. One of the optical fibers is a transmit fiber to route light from a laser source and the other fiber is a receive fiber to route light to a photo detector. Disposed at an end of each fiber holder 136 is an optical lens 132. An adhesive is used to hold the optical lenses 132, fiber holders 136, and optical fibers 134 in place. The optical fibers 134 may be coated in a high temperature material to withstand temperatures up to 1300 degrees Fahrenheit, making high temperature uncooled optical probe employable in every stage of high pressure compressors and low pressure compressors of a gas turbine engine. The optical fibers proximate the lens 132 are polished to have a flush surface with the end of the fiber holders 136.

The optical lens 132 may be convex or may be a gradient index of refraction (GRIN) lens. The optical lenses 132 may be made of a transparent material, such as sapphire or silica. As a result, high temperature optical lenses 132 may withstand temperatures of up to 2000 degrees Fahrenheit. In one embodiment, the optical lens 132 collimates the light from the fiber 134.

The fiber holders 136 may be made of a superalloy, such as Incoloy®. In alternative embodiments, the fiber holders 136 may be made of an alloy or a superalloy, such as Haynes® 242® or Waspaloy®. The adhesive used to hold the optical lenses 132, fiber holders 134, and optical fibers 134 in place may be a high temperature adhesive, such as a Cotronics Resbond 907TS variant, which can withstand temperatures of up to 2200 degrees Fahrenheit.

Figure 6:
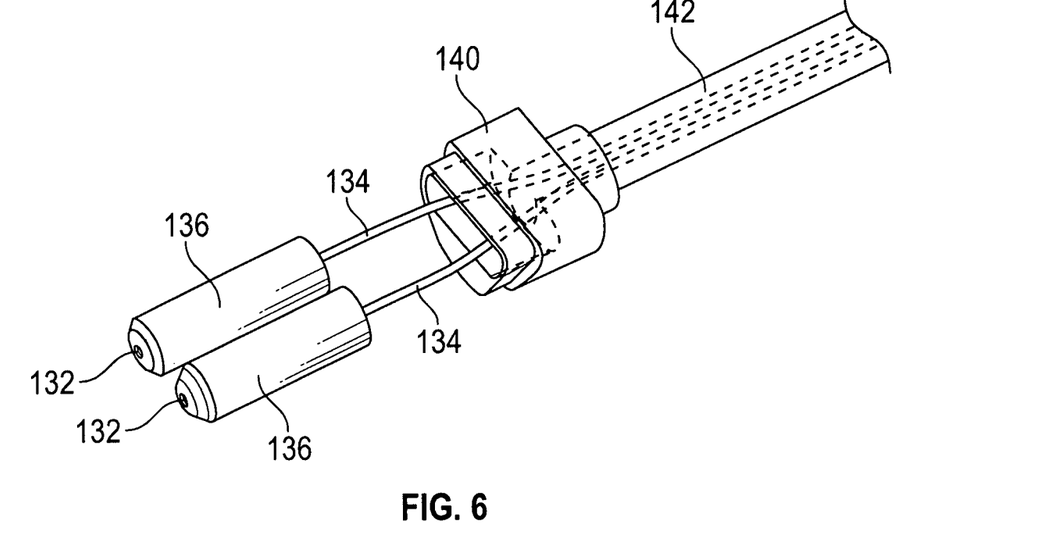
FIG. 6 is a perspective view of a portion of the optical probe in a partially assembled condition.

Referring now to FIG. 6, the optical fibers 134 are routed through respective channels of a cap 140. The cap 140 provides a connection between an inner tube 142 that houses an aft portion the optical fibers 134, while also providing integrated channels for cooling and/or purging of the interior of the housing 102. The cap 140 is brazed to the inner tube 142 and then slid over the fibers 134 during assembly.

Figure 7:
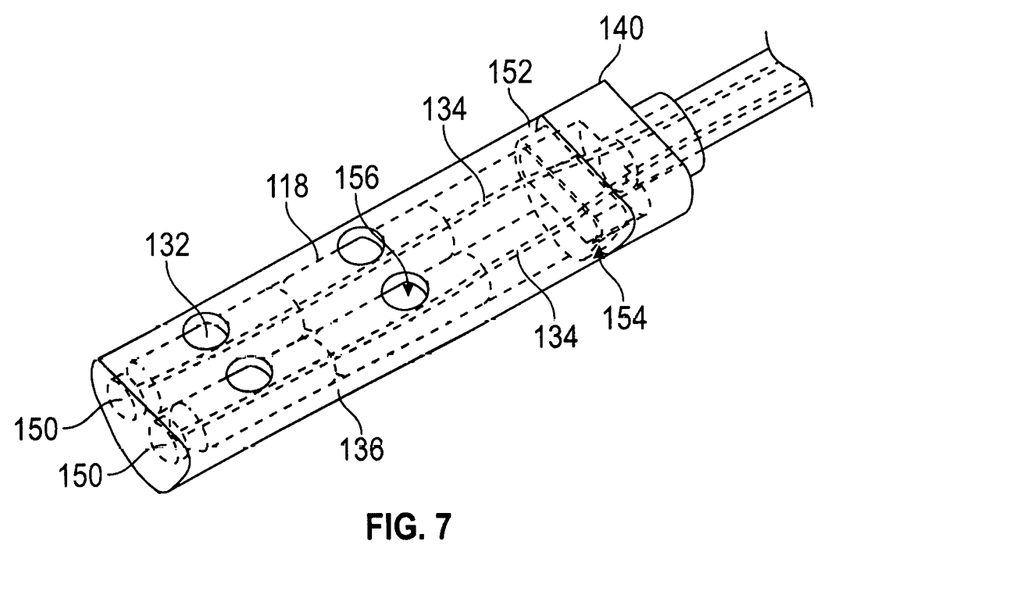
FIG. 7 is a perspective view of a portion of the optical probe in a partially assembled condition.
Figure 8:
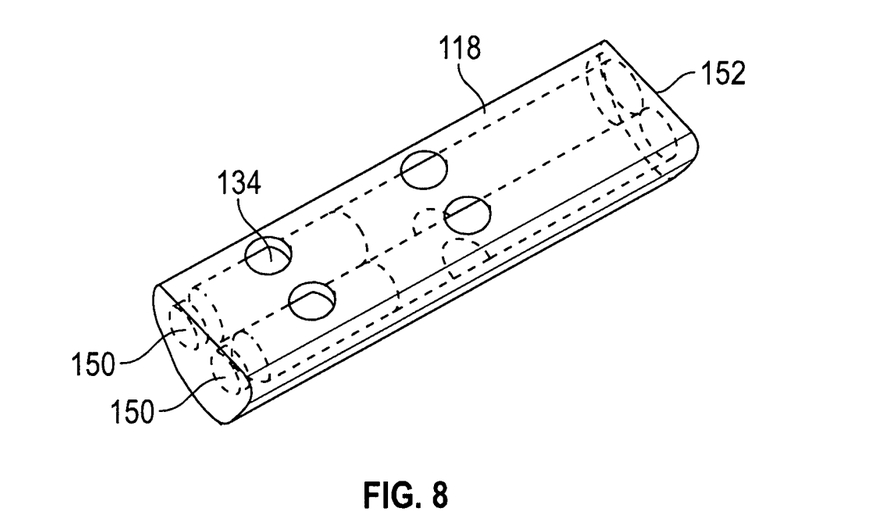
FIGS. 8 and 9 are perspective views of an optical head of the optical probe.
Figure 9:
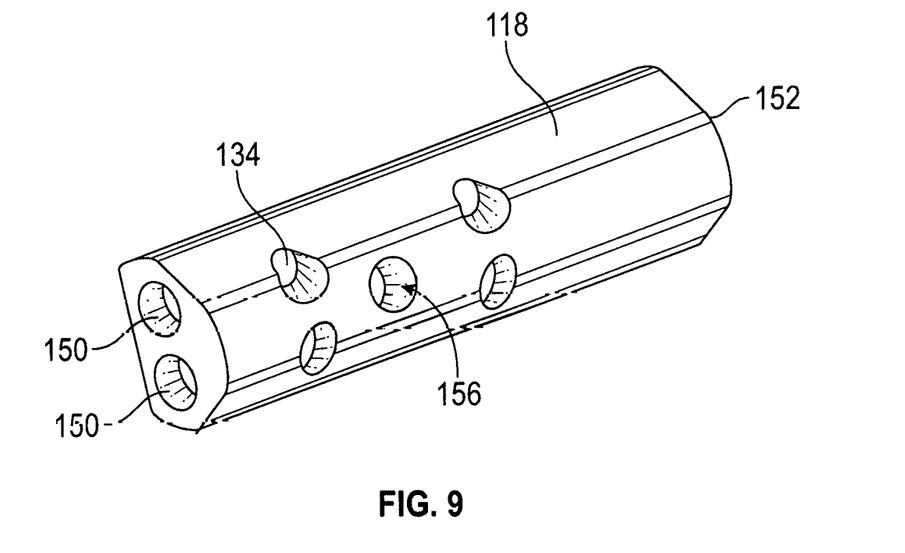

Referring to FIGS. 7-9, the optical head 118 is illustrated in detail. The optical head 118 includes through holes 150 extending axially in a longitudinal direction of the optical head 118. The optical lenses 132 and the fiber holders 136 are inserted into an aft side 152 of the optical head 118 and the cap 140 is welded to the aft side 152. A pocket 154 or other location feature of the optical head 118 at the aft side 152 provides a feature to assist with proper locating of the cap 140 relative to the optical head 118. Multiple holes 156 are provided along optical head 118 to allow for the optical lenses 132 and the fiber holders 136 to be glued into place within the optical head 118.

Figure 10:
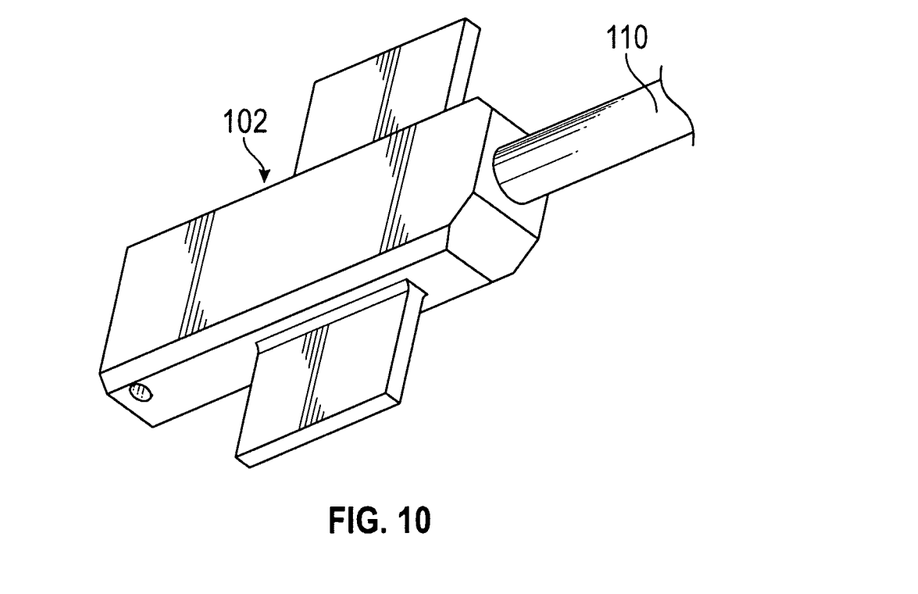
FIGS. 10 and 11 are perspective views of a portion of the optical probe in a partially assembled condition.
Figure 11:
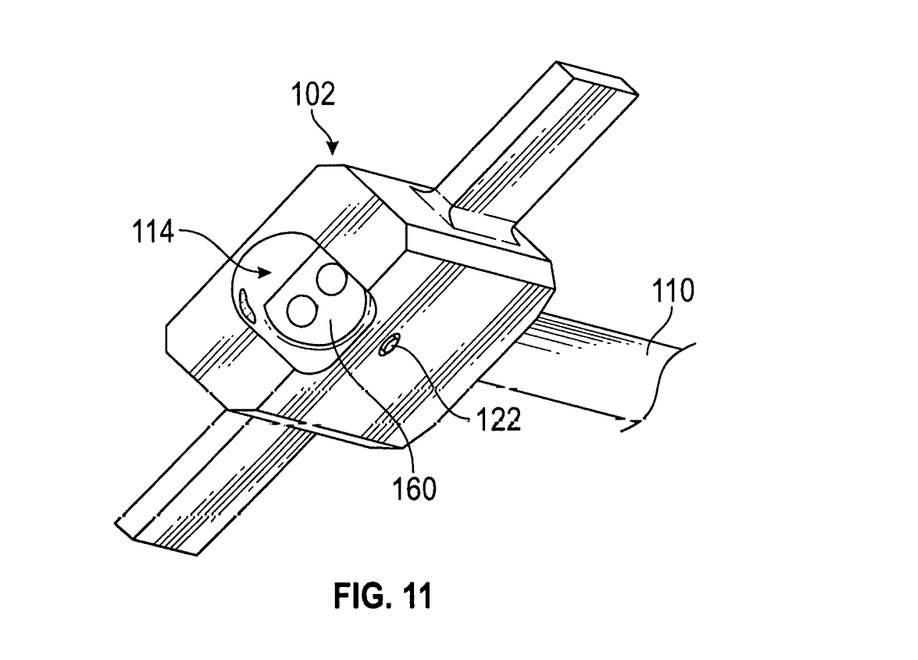
Figure 12:
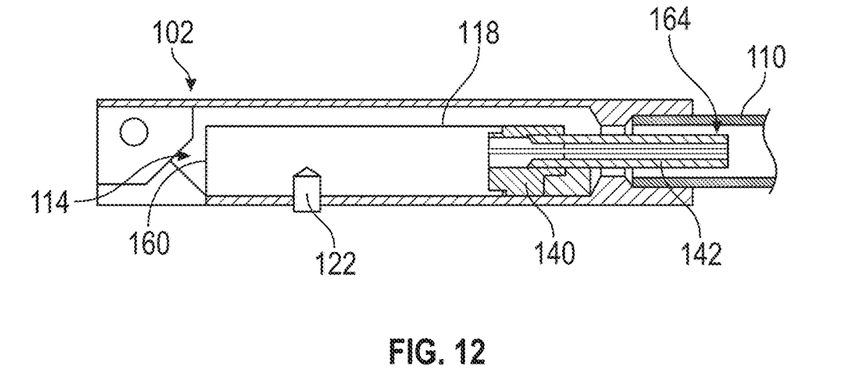
FIG. 12 is an elevational, cross-sectional view of a portion of the optical probe in a partially assembled condition.

FIGS. 10-12 illustrate the optical head 118 and the cap 140 disposed within the housing 102. The optical head 118 is inserted and slid into the housing 102 to place the forward end 160 of the optical head 118 within the view window 114. Once the optical head 118 is in the desired position within the housing 102, the optics head retention pin 122 or a similar mechanical fastener is inserted through the housing 102 and into the optical head 118 to fix the position of the optical head 118. The inner tube 142 is also shown in FIG. 12 to be at least partially inserted into the housing 102. The outer tube 110 is placed concentrically around the inner tube 142 and brazed to the housing 102. The inner tube 142 and the outer tube 110 are radially spaced from each other to define an annulus 164 that allows for cooling air to be routed therethrough or to purge the interior of the housing 102.

Figure 13:
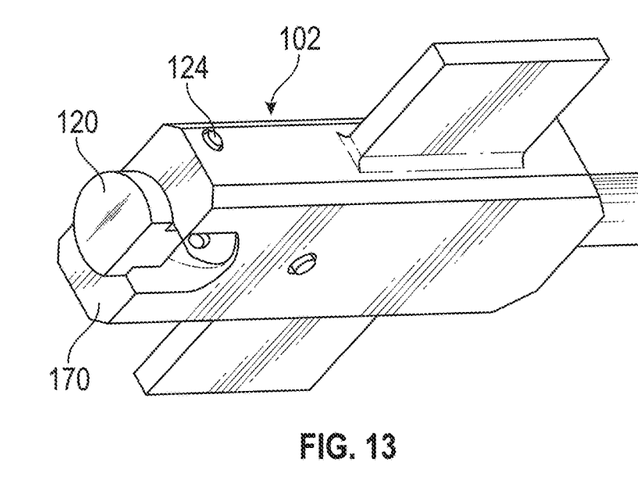
FIG. 13 is a perspective view of the optical probe in a fully assembled condition.
Figure 14:
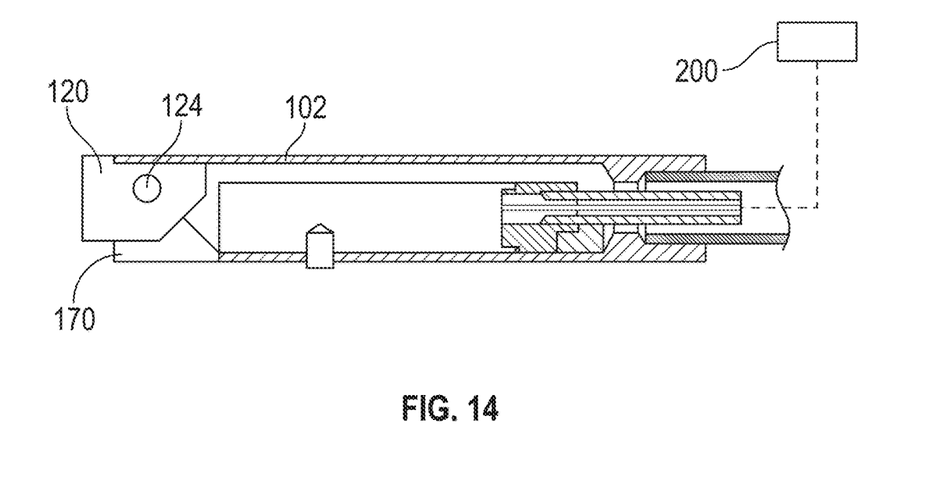
FIG. 14 is an elevational, cross-sectional view of the optical probe in a fully assembled condition.

Referring to FIGS. 13 and 14, a final assembled condition of the optical probe 100 is illustrated. The mirror 120 is installed at a forward end 170 of the housing 102 in a desired position. The mirror retention pin 124 or a similar mechanical fastener is inserted through the housing 102 and into the mirror 120 to fix the position of the mirror 120.

The optical fibers are electrically connected to a measurement device 200, as shown in FIG. 14. The measurement device 200 is configured to determine various vibratory modes. The measurement device 200 may include a processor and a memory. The processor can be any type or combination of computer processors, such as a microprocessor, microcontroller, digital signal processor, application specific integrated circuit, programmable logic device, and/or field programmable gate array. The memory is an example of a non-transitory computer readable storage medium tangibly embodied in or operably connected to the path determination system including executable instructions stored therein, for instance, as firmware.

The transmit fiber is optically connected to a laser source controlled at the measurement device 200. The receive fiber is optically connected to a photo-detector which is electrically connected to the measurement device 200.

The embodiments described herein provides a probe that can be fully embedded in the radial flow separation wall 72 to collect NSMS data without any impact to the BOM hardware.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An optical probe for a gas turbine engine comprising: a housing;

a plurality of optical fibers, a portion of each of the optical fibers secured to fiber holders;

an optical head disposed within the housing and having channels extending in a longitudinal direction of the optical head, the fiber holders disposed within the channels;

a cap disposed within the housing and operatively coupled to the optical head, the plurality of optical fibers extending through the cap;

an inner tube operatively coupled to the cap, the plurality of fibers extending through the inner tube; and an outer tube surrounding a portion of the inner tube to define an annulus therebetween, that allows for cooling air to be routed therethrough or to purge the interior of the housing, the outer tube operatively coupled to the housing.

2. The optical probe of claim 1, wherein the outer tube is brazed to the housing.

3. The optical probe of claim 1, wherein an axial position of the optical head is fixed with an optical head retention pin extending through the housing and into the optical head.

4. The optical probe of claim 1, wherein the optical head defines a plurality of holes proximate the fiber holders to secure the fiber holders thereto with an adhesive.

5. The optical probe of claim 1, wherein a forward end of the optical head is disposed within a view window defined by the housing.

6. The optical probe of claim 5, further comprising a mirror operatively coupled to the housing within the view window.

7. The optical probe of claim 6, wherein the mirror is operatively coupled to the housing with a mirror retention pin extending through the housing and into the mirror.

8. The optical probe of claim 1, wherein the cap is welded to the optical head.

9. The optical probe of claim 1, wherein the cap is brazed to the inner tube.

10. The optical probe of claim 1, wherein the cap includes channels for fluidly coupling the annulus defined by the inner and outer tubes with an interior of the optical head.

11. A gas turbine engine comprising:
a flow separation wall separating a first flow path from a second flow path; and
an optical probe embedded within the flow separation wall, the optical probe comprising:
a housing, the housing operatively coupled to the flow separation wall;
a plurality of optical fibers, a portion of each of the optical fibers secured to fiber holders;
an optical head disposed within the housing and having channels extending in a longitudinal direction of the optical head, the fiber holders disposed within the channels;
a cap disposed within the housing and operatively coupled to the optical head, the plurality of optical fibers extending through the cap;
an inner tube operatively coupled to the cap, the plurality of fibers extending through the inner tube; and
an outer tube surrounding a portion of the inner tube to define an annulus therebetween, that allows for cooling air to be routed therethrough or to purge the interior of the housing, the outer tube operatively coupled to the housing.

12. The gas turbine engine of claim 11, wherein the housing includes at least one flange and a main body portion, the main body portion defining an interior of the housing.

13. The gas turbine engine of claim 12, wherein the at least one flange is welded to the flow separation wall.

14. The gas turbine engine of claim 11, wherein the optical probe is completely embedded within the flow separation wall.

15. The gas turbine engine of claim 11, wherein the cap is welded to the optical head.

16. The gas turbine engine of claim 11, wherein the cap is brazed to the inner tube.

17. The gas turbine engine of claim 11, wherein the cap includes channels for fluidly coupling the annulus defined by the inner and outer tubes with an interior of the optical head.

* * * * *